Sept. 27, 1927.  1,643,653

G. DEN BESTEN

SAFETY HITCH

Filed Feb. 23, 1926  2 Sheets-Sheet 1

Inventor
Gerrit Den Besten
By Frank E. Liverance, Jr.
Attorney.

Sept. 27, 1927.

G. DEN BESTEN

SAFETY HITCH

Filed Feb. 23, 1926

Inventor
Gerrit Den Besten
By Frank E. Liverance, Jr.
Attorney.

Patented Sept. 27, 1927.

1,643,653

UNITED STATES PATENT OFFICE

GERRIT DEN BESTEN, OF HOLLAND, MICHIGAN.

SAFETY HITCH.

Application filed February 23, 1926. Serial No. 89,944.

This invention relates to a safety hitch primarily adapted for use in connecting a tractor or like draft machine with an implement drawn thereby, such as a plow, and the hitch is so constructed that when a predetermined strain greater than the normal pulling strain between the tractor and implement is encountered, an automatic disconnection of the tractor from said implement occurs through the operation of the safety hitch of the invention, thus insuring against breakage or like undesirable happenings. The hitch which I have invented provides for the automatic release of the tractor from the plow or other implement drawn thereby in instances where an obstruction is encountered, putting a heavier strain than normal on the same, this heavier strain operating the hitch for the desired release.

The invention comprises many novel details of construction and arrangements and associations of parts for effectively accomplishing the ends stated, as well as many others not at this time particularly enumerated. In particular one feature of my invention resides in the economy of manufacture of the hitch, the parts thereof being very easily manufactured and requiring practically no machine work on the castings used to make the device so that the manufacturing cost is very low. For an understanding of the invention reference may be had to the following description taken in connection with the accompanying drawings, in which Fig. 1 is a plan view of the hitch in its normal working position.

Like reference characters refer to like parts in the different figures of the drawings.

Figure 1:
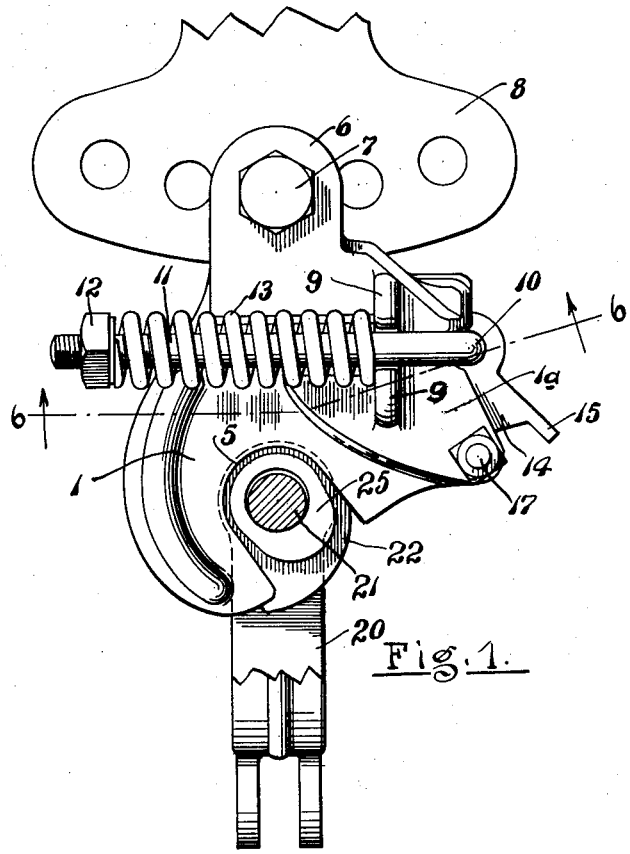
Figure 2:
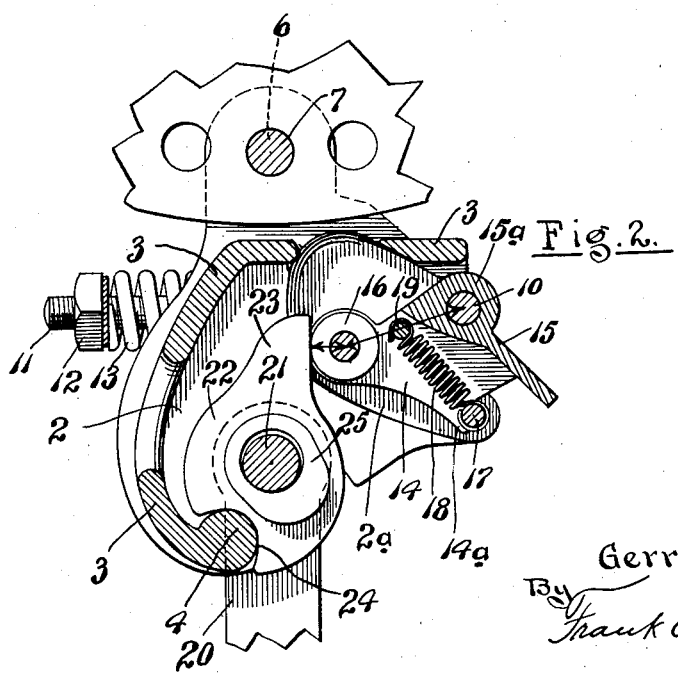
Fig. 2 is a horizontal section through the construction shown in Fig. 1, the upper side of the housing of the device being removed and the mechanism being in the position which it occupies when the tractor and implement are connected together.
Figure 3:
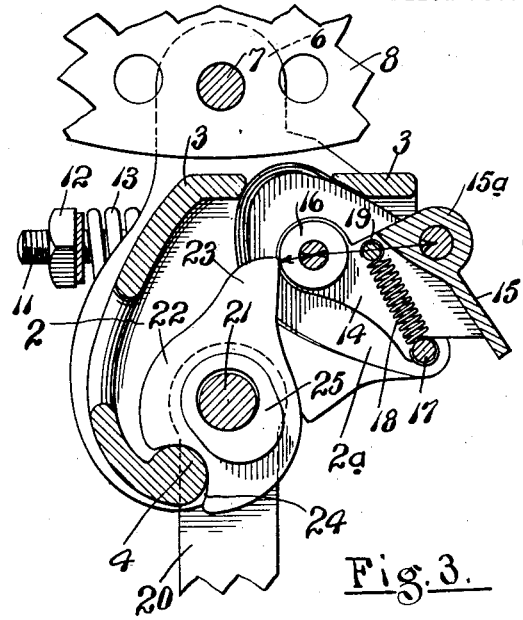
Fig. 3 is a view similar to Fig. 2 showing the hitch parts as they are when automatic disconnection is about to occur.
Figure 4:
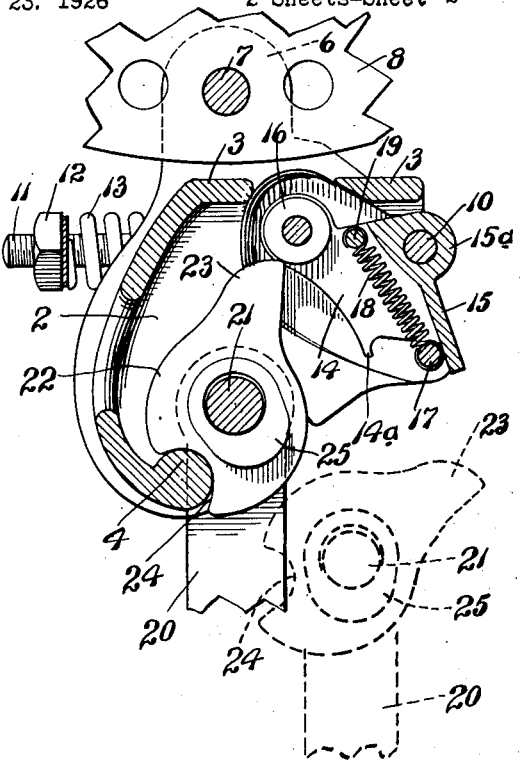
Fig. 4 is a view similar to views 2 and 3 showing the parts as they are at or about the time the disconnection takes place.

In the construction of the hitch as illustrated, a housing casting is provided having an upper horizontal side or plate 1 which at one side is slightly raised as indicated at 1ª. It also includes a lower side or plate 2 which, directly opposite the portion 1ª is depressed as indicated at 2ª. Said upper and lower plates 1 and 2 are integrally connected at one edge by a web 3 as shown in Figs. 2, 3 and 4 in which openings are made at various places, the web at its end being thickened and formed into a substantially cylindrical post as indicated at 4, for a purpose which will later appear. Between opposite ends of the web 3 the housing is open as shown. In the upper and lower sides of the housing adjacent the post 4, angularly positioned recesses 5 are made of the form shown, and substantially opposite these recesses the casting is formed with projecting upper and lower ears 6 through which a bolt or pin 7 may pass through any one of the openings made in the part 8 which is the end of the tractor hitch lug, and in this manner the housing may be connected to the tractor.

Figure 6:
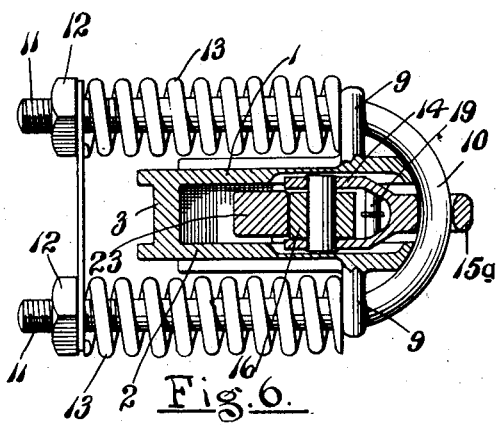
Fig. 6 is a vertical section substantially on the plane of line 6—6 of Fig. 1.

On the upper and lower sides of the raised and depressed portions 1ª and 2ª of the housing plates 1 and 2, upwardly and downwardly extending spaced apart ears 9 are cast. A rod 10 is bent into U-shape so that the legs 11 thereof extend between the ears, the bend of the U coming against a side of the housing as best shown in Fig. 6. Nuts 12 are threaded on to the ends of the legs 11 and strong coiled springs 13 are disposed between said nuts and the ears 9.

Inside the housing a member of channel shape is located being disposed between the parts 1ª and 2ª of said housing and having upper and lower flanges 14 connected by a web 15 which, at one end is somewhat thickened and enlarged, as at 15ª, to form a bearing through which the bend of the rod 10 passes thereby pivotally mounting the member on the rod. A roller 16 is rotatably mounted between the flanges 14 at the inner end of the member. A pin 17 extends between the housing upper and lower plates to which a spring 18 is connected at one end, the opposite end of the spring being connected to a post or pin 19 disposed between the upper and lower flanges 14. This construction is fully shown in Figs. 2, 3 and 4 and the spring 18 under tension normally swings the member in a counter clockwise direction until the stop lips 14ª on the flanges 14 come against the rod 17.

On the implement which is to be drawn by the tractor, a clevis 20 is connected, the pin 21 of which, carried between its upper and lower arms, passes through a member 22 of somewhat irregular shape of the form shown in Figs. 2, 3 and 4, it having a lug 23 projecting from one side and a recess 24 substantially in the opposite side shaped so that it may fit over the post 4 previously described. On the upper and lower sides of the member 22 upwardly and downwardly extending bosses 25 are cast which are of a shape to be freely received within recesses 5 in the upper and lower plates 1 and 2 of the housing.

Figure 5:
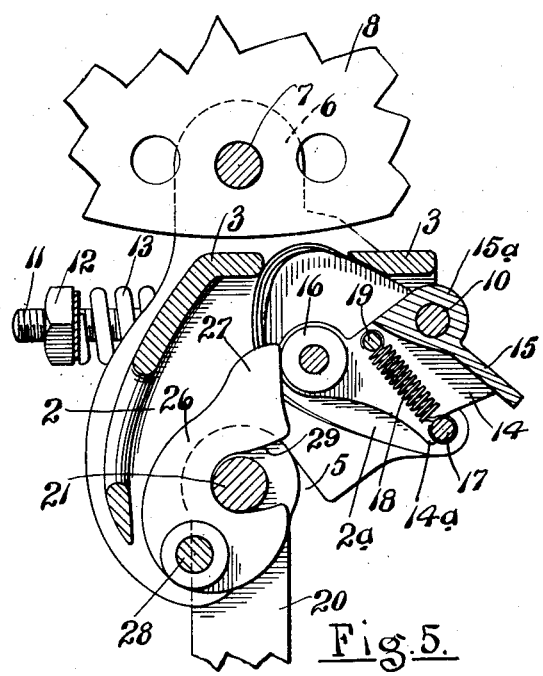
Fig. 5 is a like view illustrating a slightly different form of construction, serving the same ends and equivalent to the structures shown in the preceding figures.

In Fig. 5 a somewhat different form of the invention is shown, the member 22 being replaced by the member 26 which also has a lug 27 corresponding in shape to the lug 23 previously described. This member is pivotally mounted on a pin 28 which is disposed between upper and lower plates 1 and 2 of the housing and occupies the portion, substantially, of the part 4, and in its side has a recess or slot 29 in which the clevis pin 21 may be received.

With the parts engaged, as shown in Fig. 2, member 22 bearing against the post 4 has a tendency to rotate in a clockwise direction. This brings the lug 23 against the roller 16. The direction of the force of pressure of lug 23 against this roller is directly outward toward the axis of the roller pin as indicated in Fig. 2, and this accordingly tends to turn the member 14 about the rod 10 in a counter clockwise direction until stopped by the lips 14ª against pin 17. Under all normal strains of operation the parts will remain together and there will be no disconnection of the hitch. If a very severe or abrupt strain is encountered, the pressure imparted by the lug 23 against the roller 16 causes a compression of the springs 13 and a longitudinal movement of the U-shape rod 10 so that the member 22 may turn about the axis of the pin 21 and there will be a movement of the roller 16 along the side of the lug 23 whereby the parts will assume the position shown in Fig. 3, whereupon the force of pressure of the lug against the roller will turn the member carrying the roller 16 in a clockwise direction and member 22 will disconnect therefrom and the tractor and implement will be freed of each other with no liability of breakage of any part of either, which otherwise might occur. With the passage of the nose of lug 23 from the position shown in Fig. 3 to that shown in Fig. 4, or after the lines of force of the toggle indicated in Fig. 2, have passed by dead center, springs 13 return the U-shape rod to normal position and the rotation of the member carrying roller 16 in a clockwise direction, will be accompanied by an elongation of spring 18 as shown in Fig. 4.

The construction shown in Fig. 5 operates on the same principle, the only difference being that, as member 26 is connected to the pin 28, said member does not disconnect from the housing but the clevis pin 21 disconnects from the member 26 by reason of the open slot at 29 permitting such disconnection. Otherwise the operation is identical with that described with reference to Figs. 2, 3 and 4.

The reconnection of the parts is easily accomplished, it being necessary merely to move the member 22 inwardly into the housing and a secure connection of the parts will be made and one which will continue under all normal strains and which will break only with sudden or excess strains such as when a plow or the like strikes an obstruction in the ground. It is also apparent that, if it is desired, the disconnection of the tractor from the implement may be accomplished by manually operating the member which carries the roller 16 to the position shown in Fig. 4. The strength of the spring 18 is light and needs to be only enough to insure that said member will normally turn in a counter clockwise direction.

The constructions described are very simple, and are made easily from castings without the necessity of machine work other than drilling or reaming a few holes so that the manufacturing cost is very low. It is durable and practical and has so proved in practical tests.

I claim:

1. An automatic hitch, comprising a support including upper and lower plates connected at one side and open at another side, each of said plates having a slot at the open side of the support, a rod bent into U-shape around said support, spring means disposed between the support and the ends of the rods for drawing the bend of said rod against a side of the support, a member pivotally mounted on said rod at the bend thereof and extending between the upper and lower plates, spring means tending to turn said member in one direction, a clevis having a clevis pin adapted to pass into the slots of said upper and lower plates, and means associated with the clevis pin engaging with said support and against said member, said means tending to rotate and bear with pressure against said member on the application of a pulling force to said clevis whereby the spring means on said U-shaped rod is overcome and the member moved outwardly when the force exceeds a predetermined amount, thereby effecting an automatic disconnection of the clevis.

2. An automatic hitch, comprising a support including upper and lower spaced apart plates connected at one side and open at another side, said plates having slots at the open side of the support, a member located between said plates having upper and lower sides and a connecting web at its outer portion, a roller mounted between said upper and lower sides of the member at the inner portion thereof, a U-shaped rod passed through the web at one end thereof, the legs of said rods passing above and below the support, nuts threaded on to the ends of the rod, heavy coiled compression spring disposed around each leg of the rod between said nuts and the plates, a spring connected to said member and to the support tending to turn said member in one direction, a clevis having a clevis pin adapted to enter the slots in said plates, and means associated with said clevis pin and located between the upper and lower plates of the support when at operative position, having one end bearing against said roller and having an opposed portion mounted for pivotal movement about a fixed part on said support, whereby, when a pulling force is applied to the clevis, said second member is rotated to bear with force against the roller and on the application of a predetermined force, moves said member outwardly by compressing the spring means on said rod and thereafter turns the member against its spring means thereby effecting an automatic disconnection of the clevis.

3. An automatic hitch comprising a support including upper and lower connected spaced apart plates having slots in vertical alignment opening to the outside at an open side of the support, a member located between said plates at one side of the slot, a U-shaped rod on the bend of which said member is pivotally mounted, said rod having legs passing one above and the other below said support, nuts on the free ends of said legs, heavy coiled springs located around said legs between the nuts and said upper and lower plates, a roller carried by said member at the inner portion thereof, relatively light spring means tending to turn said member in one direction, a clevis having a clevis pin adapted to be received in the slots in said upper and lower plates, a second member adapted to be connected against the roller and, at substantially its opposite side, being adapted to have pivotal movement about and with respect to a fixed part of the support, whereby the application of an extreme pulling force to the clevis will turn said member about its axis and cause the lug to bear against the roller with sufficient pressure to compress the springs carried by said U-shaped rod and move said member outwardly and automatically effect a disconnection of the clevis.

4. In a device of the class described, a support comprising upper and lower plates integrally connected at one side by a vertical web, said web at one end being formed into a substantially cylindrical post and said plates adjacent said post having upper and lower vertically aligned slots, a clevis having a clevis pin to pass in said slots, a member pivotally mounted on the pin having a recess in one side to engage against said post and having a lug projecting inwardly from its opposite side, said member passing between the upper and lower plates of the support, a U-shaped rod bent around one side of the support and having one leg passing above and the other below said support, nuts threaded onto the free ends of said legs, heavy coiled springs disposed around said legs between the nuts and the support, a member pivotally mounted on the bend of said rod and extending into the space between the upper and lower plates of the support, said member at its inner portion carrying a roller bearing against the lug of said first member, and a spring acting on said second member normally tending to turn the same so as to bring the roller against the lug of said first member.

5. An automatic hitch comprising a body, a strain member having a pivotal bearing upon said body, a retaining member having a pivotal bearing upon said body, said retaining member having a portion spaced from its bearing in engagement with the portion of the strain member spaced from its bearing, means for attaching a coupling member to the strain member and yieldable means to hold the retaining member in position to engage the strain member whereby strain upon the coupling member sufficient to overcome a resistance of the yieldable member will pivot the retaining member to release the strain member.

6. An automatic hitch comprising a body, a strain member having a pivotal bearing upon said body, a retaining member having a pivotal bearing upon said body, a portion of said retaining member spaced from its bearing engaging a portion of said strain member spaced from its bearing, means for attaching a coupling member to said strain member, yieldable means pivotally connected to the retaining member to hold it in engagement with the strain member, the first named pivotal bearing of the retaining member being releasable when the retaining member is pivoted on the yieldable means, whereby strain upon the coupling member sufficient to overcome the resistance of the yieldable member will pivot the retaining member, first on its pivotal bearing on the body and then on its pivotal connection with the yieldable member to release the strain member.

7. An automatic hitch comprising a body, a strain member having a pivotal bearing upon said body, a retaining member having a pivotal bearing upon said body, a portion of said retaining member spaced from its bearing engaging a portion of said strain member spaced from its bearing, means for attaching a coupling member to said strain member, yieldable means pivotally connected to the retaining member to hold it in engagement with the strain member, the first named pivotal bearing of the retaining member being releasable when the retaining member is pivoted on the yieldable means, a light spring tending to pivot the retaining member on the yieldable means to hold the first named pivotal bearing thereof into engagement, whereby strain upon the coupling member sufficient to overcome the resistance of the yieldable member will pivot the retaining member, first on its pivotal bearing on the body and then on its pivotal connection with the yieldable member to release the strain member.

GERRIT DEN BESTEN.